United States Patent Office 3,076,760
Patented Feb. 5, 1963

3,076,760
COMPOSITION FOR PREVENTING ACID SLUDGE IN OIL WELL ACIDIZING PROCESSES
Wendell G. Markham, Downey, Calif., assignor to Petrolite Corporation, Ltd., Wilmington, Del., a corporation of Delaware
No Drawing. Filed Aug. 20, 1959, Ser. No. 834,949
20 Claims. (Cl. 252—8.55)

This invention relates to the art or procedure commonly referred to as the acidization of oil-bearing strata which comprises introducing an acid into an oil well for the purpose of causing the acid to disintegrate, dissolve, or react with the oil-bearing structure of the well, in a manner which results in an increase in the amount of crude petroleum obtained from the oil-bearing strata. More particularly, this invention relates to compositions useful in preventing the formation of acid sludge during such acidization, and to the use of said compositions in acidizing oil-bearing strata.

The acidization of oil-bearing strata is a well known method of increasing oil production. The main constituent of such acid treating compositions is an acid, usually hydrochloric acid. This treating fluid, sometimes known as oil well acid, usually contains a demulsifier, a corrosion inhibitor, a surfactant, and various other agents required for a specific reaction on the oil-bearing strata. For example, in strata which are predominantly sandstone, hydrofluoric acid, fluorides, boric acid, etc., are also constituents of the acid treating composition. Although commercial hydrochloric acid is available at a concentration of 31.5 to 37 percent by weight, concentrated acid is generally diluted with water to 15 percent for most acidizing jobs. However, acid varying in strength from about 5 to about 30 percent HCl has been employed in the preparation of oil well acid.

In general, the composition of the oil-bearing strata and the bottom hole temperature are the chief factors which influence the selection of all additives except the demulsifier. Selection of the demulsifier is generally dependent upon the crude oil itself. Although many crude oils when mixed with acid will form emulsions if no demulsifier is present, small amounts of a properly selected demulsifier in the acid will effect demulsification of the acid from the crude oil within a short time.

Another factor which is a cause of ineffective acidizing is the formation of acid sludge. Most people do not recognize this factor, since they believe acid sludge and acid-in-oil emulsions to be the same thing. However, it cannot be overemphasized that acid sludge and emulsification are two separate and distinct phenomena. Acid sludge often occurs where no emulsions are formed or where a demulsifier is present to assist in the separation of two liquid phases. An acid sludge consists of tiny solid dark particles which settle to the bottom of the oil layer at the interface above the acid layer. Often it may be observed visually as a wafer after the supernatant crude oil has been poured off. In a well this acid sludge clogs the pores of the formation and thus diminishes the flow of oil to the well bore. The technique of stimulating oil production by the acidization of some oil-bearing zones in California has often been avoided or discontinued where the formation of acid sludge with hydrochloric acid poses a severe problem.

I have observed that acids such as sulfuric, hydrochloric, nitric, trichloroacetic, etc., form acid sludges when intimately mixed with some, but not all, crude oils at room temperature or above. The amount and properties of the sludge formed is dependent upon variables such as: temperature, acid-to-oil ratio, degree of mixing, acid normality, degree of ionization, reaction time, and the zone or strata from which the oil is obtained. Acid sludge may be recognized as the viscous layer which separates oil from acid after all the acid has separated from the oil upon standing a few hours after mixing. Often the sludge layer can be separated from the oil and the acid in the form of a wafer. The wafer, when dried, appears to consist of loosely consolidated solid particles of asphaltenes which are completely soluble in carbon disulfide. Since acid sludge is composed primarily of solids, it is not an emulsion, although an emulsion may contain particles of acid sludge.

The mechanism of acid sludge formation is not understood. However, I have tested crudes from several states including California, Colorado, Wyoming, and abroad, for example Iran, and have found a sufficient amount of acid sludge formed to severely damage a formation by clogging subsequent to acidization. Acid sludge is not formed in all acid jobs. Samples of crude oil from various locations were tested to see if they all formed an acid sludge upon being intimately mixed with an equal volume of 15 percent HCl at room temperature, then allowed to settle at 140° F. Many crudes formed no acid sludge when tested in this manner. Some formed acid sludge which varied from 0 to 16 percent of the oil volume. It was observed that crude oils from different zones, in the same field, have different sludging characteristics as shown in Table I below.

TABLE I

Acid Sludge Tests With Seal Beach and Inglewood Crudes

INGLEWOOD, CALIFORNIA, FIELD

| Zone | ° API | Production interval [1] | Acid sludge (vol. percent of crude) |
|---|---|---|---|
| Investment | 15.2 | 799–1,643 | None. |
| Vickers | 21.8 | 1,300–2,645 | None. |
| Rindge | 28.7 | 2,551–3,210 | 2 |
| Rubel | 28 | 3,256–3,460 and 3,819–3,948 | 8 |
| Moynier | 23.8 | 4,482–5,476 | 3 |
| Sentous | 36.3 | 8,124–3,823 | 4 |

SEAL BEACH, CALIFORNIA, FIELD

| San Gabriel | 23.3 | 4,505 | None |
| Wasem | 25.6 | 5,760 | None |
| Selover | 29.4 | 6,470 | None |
| McGrath | 30 | 9,300 | 16 |
| Lane | 31 | 10,283 | None |

[1] Depth at bottom of zone.

I have now discovered that hydrocarbon substituted phenols, for example, alkyl and alkenyl phenols (also referred to hereafter as "substituted phenols"), effectively prevent the formation of acid sludge during the acidization of oil wells. In practice, the process of this invention comprises using these substituted phenols in conjunction with acidizing compositions heretofore employed. Examples of substituted phenols are those of the formula:

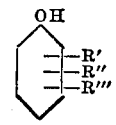

in which R', R", and R'" are hydrogen or a hydrocarbon group such as alkyl or alkenyl group substituted on the aromatic nucleus, at least one of which is an alkyl or an alkenyl group, and on which group there is present at least four carbon atoms, for example four to twenty-four, but preferably eight to fifteen, and substituted in any position. It is preferred that the sum of all the carbons on all the R groups be at least eight. Examples of the R', R", and R''' groups are butyl, amyl (pentyl), hexyl, heptyl, octyl, nonyl, decyl, undecyl, dodecyl, tridecyl, tetradecyl, pentadecyl, octadecyl, nonadecyl, etc., analogs and isomers thereof, and the like. In addition, corresponding unsaturated analogs and homologs of these R', R", and R''' groups can also be employed. Specific preferred examples are monosubstituted phenols which are liquid at room temperature, such as nonyl, dodecyl, tetradecyl, and pentadecenylphenol. An example of a preferred pentadecenylphenol is Cardanol NC–700 (Irvington Chemical Division of Minnesota Mining and Manufacturing Company). It is to be understood that alkenyl alkyl phenols wherein one or more R's is alkenyl and one or more R groups are alkyl is within the scope of this invention. Admixtures of alkyl, alkenyl and alkenyl alkyl phenols may also be employed.

In practice, an anti-sludging additive should have the following desirable properties. The additive should:

(1) Effectively prevent the formation of acid sludge in crude oil over a wide range, for example, an acid concentration of 5 to 30 percent by weight HCl.

(2) Require a small amount of reagent.

(3) Be easily dissolved, dispersed, suspended or emulsified in the acid.

(4) Be stable in acid for many hours at 200° F.

(5) Be non-detrimental to the activity of other ingredients present in the acid.

(6) Be unaffected by spent acid or a 20 percent calcium chloride solution.

(7) Be so economical to employ that the additive can be used in the formulation of all oil well acid without the need of testing every crude oil.

Substituted phenols fulfil all except one of the above requirements—namely, they are not easily dissolved or dispersed in the acidizing medium since they are insoluble in HCl. However, these materials are very effective anti-sludging agents when dissolved in oil. Since they are not miscible with hydrochloric acid, a special procedure has been devised to allow the substituted phenols to be transported to the oil in the formation where they can fulfil their anti-sludge function. Substituted phenols which are substantially insoluble in the acidizing medium may be dispersed in the acid by means of a suitable emulsifying agent that will not stabilize acid-in-oil emulsions which could be formed in the strata from which the oil is derived.

I have discovered anti-sludge compositions which fulfil all of the above requirements. In essence, these compositions comprise an emulsion, suspension, or dispersion of a substituted phenol in the acidizing medium. Any suitable method of effecting such an emulsion, suspension, or dispersion can be employed. However, I have discovered an effective composition capable of being facilely emulsified in the acidizing medium which comprises:

(1) A substituted phenol, for example mono-, di-, or tri-substituted phenols, but preferably a monoalkyl or monoalkenyl phenol.

(2) A coupling agent, preferably a monohydroxy aliphatic alcohol or a monocarboxylic acid, but preferably the alcohol.

(3) A suitable emulsifier. Although the coupling agent need not be employed, the concentration of emulsifier required to emulsify the alkylphenol in the acid is generally considerable unless a coupling agent is used.

As coupling agents the alcohols are superior to the carboxylic acids, and are the preferred coupling agents. Examples of alcohols and carboxylic acids are those of the formula R—X where X is —OH or

and R is alkyl. The R group should contain at least 3 carbons, for example, 3 to 10, but preferably 4 to 6. The specific alcohols most preferred are n-butyl, n-amyl, n-hexyl, and fusel oil.

There are hundreds of surface active agents which have been used as emulsifiers and demulsifiers. A suitable emulsifier for this invention is one which will, on one hand enable the insoluble substituted phenol to be emulsified in acid, and on the other hand break emulsions formed of the acid-in-oil type. There are only a limited number of chemical materials which will accomplish this dual objective. It is readily understandable why most ordinary demulsifiers for preventing the formation of water-in-oil type emulsions are ineffective. Ordinary demulsifiers either are not soluble in half-strength (15%) hydrochloric acid, or its equivalent, or they are not soluble in spent brine which is roughly equivalent to 20 percent calcium chloride and having a pH of 3.5 to 5. Furthermore, if soluble at all, they are generally decomposed. If they do not decompose under ordinary conditions, they at least decompose under the conditions of pressure and temperature encountered during acidization. The emulsifiers suitable for the purpose of this invention are best described by referring to one or more of the following patents:

U.S. Patent No. 2,470,829, dated May 24, 1949
U.S. Patent No. 2,470,830, dated May 24, 1949
U.S. Patent No. 2,589,195, dated March 11, 1952
U.S. Patent No. 2,589,196, dated March 11, 1952
U.S. Patent No. 2,589,197, dated March 11, 1952
U.S. Patent No. 2,589,198, dated March 11, 1952
U.S. Patent No. 2,589,199, dated March 11, 1952

As an example of the activity of compounds or mixtures used as an acid sludge preventive, the following laboratory anti-sludge test is presented:

Fifty ml. of 15% HCl or oil well acid are placed in a 4-oz. sample bottle. To this acid is added one ml. of anti-sludge material. The bottle is shaken thoroughly to insure complete mixing. Finally 50 ml. of a crude oil (known to form a sludge on contact with acid) is added, after which the bottle is closed and agitated by shaking for five minutes in a shaking machine at the rate of 130 oscillations per minute. The bottle is then removed and allowed to stand in a water bath for 16 hours at 140° F. and after this time separation of oil, acid, and sludge is complete. The oil layer can be poured off carefully from the underlying acid sludge layer or wafer if it is present. If there is only a small amount of sludge present in the oil layer, it may be observed as the residue which remains on a 4" by 4" piece of window screen through which the oil is poured for disposal. The relative volume of sludge may be compared with sludge from a comparable sample to which no sludge preventive was added. This comparison serves as an index of the effectiveness of a chemical in the prevention of sludge.

Test observations have shown that as the oil solubility of most sludge preventives increases, the sludge preventive ability also increases. Conversely as the water solubility increases, the sludge preventive ability decreases. It was observed that for a given chain length, straight chain monoalkyl phenols are usually superior as anti-sludgers to either the branched chain or the di- and tri-substituted normal alkyl phenols. Likewise, branched chain dialkyl phenols which have a chain of at least six carbon atoms on each radical, such as dinonyl, are preferred to dialkyl phenols which have fewer carbon atoms, such as di-tertiarybutyl phenol. Similar properties apply also to alkenyl phenols with the added advantage that unsaturated groups appear to have an additional beneficial effect since they yield a lower melting point than corresponding long chain alkylphenols without decreasing their anti-sludge properties.

I have prepared compositions which are very useful for the prevention of acid sludge during the acidization of oil bearing strata. The following is an example of such a composition which is easily emulsified in the oil well acid:

|    | Percent by volume | |
|---|---|---|
|    | General range | Preferable range |
| (1). Substituted phenol | 40–80 | 45–55 |
| (2). Monohydroxy alcohol | 0–70 | 40–50 |
| (3). Emulsifier | 2–20 | 5–10 |

From an economy-effectiveness point of view, I have found the following composition very satisfactory:

(1) Alkyl or alkenyl, 45 percent

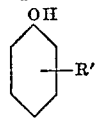

where R' is C–9 to C–15 and a minimum number of side chains are present.

(2) Alcohol, R—OH, 45 percent, where R is C–4 to C–6 and the alkyl group is normal.

(3) Emulsifier, 10 percent.

As an example of a preferred emulsifier I use a material which may be called an amine ester. It comprises the reaction product of crude tall oil with a poly-amino-reactant. I prefer to use a crude grade of tall oil which is 35–45 percent rosin acids and 45–52 percent fatty acids. The poly-amino-reactant is described in Example 1, column 7, U.S. Patent No. 2,589,199. For the esterification I mix 200 lbs. of the poly-amino-reactant with 100 lbs. of tall oil, then I heat to 250–260° C. for 6 to 8 hours to dispel water formed during the esterification.

No acid sludge is formed when the above compositions are used in the acidizing of wells in low concentrations of additive, for example, 0.05 to 5% or more, but preferably one to two percent, based on volume of active reagent to volume of oil well acid employed. In practice I advantageously employed one to two ml. of sludge preventive mixture per 100 ml. of oil well acid, wherein the mixture is at least 50% active.

Suitable substituted phenols which I prefer to employ in the practice of my invention are: 4-octyl phenol, 4-nonyl phenol, 2,4-dinonyl phenol, alkyl (C–7 to C–9) phenol mixture, and Cardanol (a mixture of naturally occurring 3-n-pentadecenyl phenols). These materials all give superior anti-sludge properties over short chain phenols such as 4-n-butyl phenol, 2,6-di-tertiary butyl phenol, 4-secondary amyl phenol, 4-tertiary amyl phenol, or 3,5 xylenol although those having at least four carbons diminish the acid sludge formed.

The following typical examples of anti-sludge compositions which I have found efficacious as sludge preventatives in the acidization of oil wells are presented for purposes of illustration and not of limitation:

In summary, I have found that substituted phenols prevent acid sludge and that a superior reagent can be prepared by admixing a substituted phenol with a monohydroxy alcohol and a suitable emulsifying agent. In general, this reagent contains 40 to 80 percent, but preferably 45 to 55 percent of substituted phenol, from 0 to 50 percent, but preferably 40 to 50 percent of the monohydroxy alcohol, and 2 to 20 percent, but preferably 5 to 10 percent of an emulsifier. Each substituted group on the phenol advantageously has at least 4 carbons, for example 4 to 24 carbons, but preferably 8 to 15 carbons. The monohydroxy alcohol is an aliphatic alcohol having at least 3 carbons, for example 3 to 10 carbons, but preferably 4 to 6 carbons. The emulsifying agent employed should be capable of emulsifying the substituted phenol in the oil well acid without stabilizing oil-acid emulsions. The preferred class of emulsifiers are various esters of fatty acids. The preferred species is a polyamino ester of tall oil.

In general, I have employed the above reagents in the acid in volumes of at least 0.05 percent, for example 0.05 to 5%, or more, but preferably 1 to 2% based on the volume of active reagent to volume of acid employed. In practice I have advantageously employed 1 to 2 ml. of sludge preventive mixture per 100 ml. of oil well acid wherein the mixture is at least 50% active.

Since acidization procedures and the use of other agents such as demulsifiers in acidizing procedures are so well known, there is no need to go into a discussion of acidizing procedures and other acidizing additives. For the sake of brevity, reference is made to the following patents which give a cross-sectional view of the art related to acidization, although there are in addition certain other practical elements which are well known and described in B. M. Kingston: "Acidizing Handbook," Gulf Publishing Company, Houston, Texas, 1947. The following United States patents are pertinent to the art of acidization of oil wells and the composition of materials used for this purpose:

| | |
|---|---|
| 1,877,504 | 2,232,931 |
| 1,891,667 | 2,233,383 |
| 1,911,446 | 2,251,393 |
| 2,011,579 | 2,262,737 to 742 |
| 2,024,718 | 2,278,838 |
| 2,038,956 | 2,663,689 |
| 2,053,285 | 2,290,413 to 417 |
| 2,125,429 | 2,290,419 |
| 2,128,161 | 2,292,208 |
| 2,128,601 | 2,300,393 |
| 2,161,085 | 2,370,421 |
| 2,175,081 | 2,400,395 |
| 2,175,095 | 2,824,834 |

The essence of the present invention is that the compositions herein disclosed and claimed are useful when

TABLE II

*A List of Examples of Some Efficacious Acid Sludge Preventatives*

| Ex. | Subs. phenol (pt. by vol.) | Vol. percent | Coupling agent | Vol. percent | Emulsifier | Vol. percent |
|---|---|---|---|---|---|---|
| 1 | Octyl phenol | 50 | n-butanol | 45 | Amine ester emulsifier [1] | 5 |
| 2 | Nonyl phenol | 45 | do | 46 | do | 9 |
| 3 | Alkyl phenol, C₇ to C₉ | 47.5 | do | 47.5 | do | 5 |
| 4 | p-sec. amyl phenol | 50 | do | 44 | do | 6 |
| 5 | Dodecyl phenol | 47.5 | do | 47.5 | do | 5 |
| 6 | Pentadecyl phenol | 46 | n-pentanol | 46 | do | 8 |
| 7 | Tetradecyl phenol | 48 | do | 45 | do | 7 |
| 8 | Pentadecenyl phenol | 47 | do | 43 | do | 10 |
| 9 | Dinonyl phenol | 50 | do | 42 | do | 8 |
| 10 | Nonyl pentadecenyl phenol | 49 | do | 44 | do | 7 |
| 11 | 1 part octyl phenol with 1 part pentadecyl phenol | 48 | Fusel oil | 45 | do | 7 |
| 12 | 2 parts nonyl phenol with 1 part pentadecenyl phenol | 45 | do | 43 | do | 12 |
| 13 | 1 part sec. amyl phenol with 3 parts nonyl phenol | 46 | do | 44 | do | 10 |
| 14 | 1 part dodecyl phenol with 1 part dinonyl phenol | 47.5 | do | 47.5 | do | 5 |
| 15 | 1 part tetradecyl phenol with 2 parts pentadecenyl phenol | 46.5 | do | 46.5 | do | 7 |

[1] Prepared by reacting 200 pounds of the polyamino compound of Ex. 1, column 7 of U.S.P. 2,589,199 with 100 pounds of tall oil at 250–260° C. for 6 hours to dispel the water formed during esterification.

employed as additives in acidizing processes or in conjunction with other acidizing additives, for example, in any of the processes disclosed in the above patents.

Having thus described my invention, what I claim as new and desire to secure by Letters Patent is:

1. A process of preventing the formation of acid sludge resulting from the acidization of oil-bearing strata which is characterized by introducing into said strata during acidization an anti-sludging amount of (1) an aliphatic hydrocarbon substituted phenol having at least four carbons on the aliphatic hydrocarbon group and (2) an emulsifying agent selected from the group consisting of (I) a reagent comprising an acylated derivative of a basic aminoalcohol of the formula:

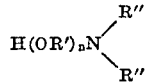

said derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy, alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

(II) a hydrophile oxyalkylated 2,4,6 $C_4$-$C_{12}$-hydrocarbon substituted monocyclic phenol $C_1$-$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

(V) a reagent comprising a substituted imidazoline selected from the group consisting of:

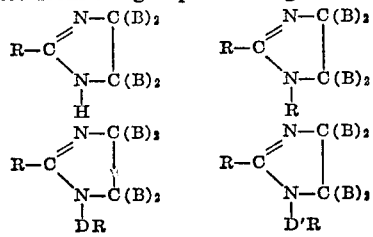

in which B represents at least one member selected from the class consisting of hydrogen and low molal alkyl radicals having less than 8 carbon atoms; D represents a divalent, nonamino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

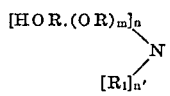

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of polyhalogenated reactant, of not more than one halogen atom from the co-valent to the electro-valent state, thereby emulsifying said substituted phenol in the acid medium without stabilizing oil-acid emulsions.

2. The process of claim 1 where the aliphatic hydrocarbon substituted phenol is a member selected from the group consisting of alkyl phenol, alkenyl phenols, alkenyl alkyl phenols and mixtures thereof.

3. The process of claim 1 where the aliphatic hydrocarbon substituted phenol is a mixture of alkylphenols having alkyl groups of 7-9 carbon atoms.

4. The process of claim 1 where the aliphatic hydrocarbon substituted phenol is monononylphenol.

5. The process of claim 1 where the aliphatic hydrocarbon substituted phenol is dinonyl phenol.

6. The process of claim 1 where the aliphatic hydrocarbon substituted phenol is dodecylphenol.

7. The process of claim 1 where the aliphatic hydrocarbon substituted phenol is tetradecyl phenol.

8. The process of claim 1 where the aliphatic hydrocarbon substituted phenol is pentadecyl phenol.

9. The process of claim 1 where the aliphatic hydrocarbon substituted phenol is pentadecenyl phenol.

10. A composition of matter useful in preventing the formation of acid sludge during the acidization of oil bearing strata which consists essentially of an emulsion of anti-sludging quantities of an aliphatic hydrocarbon-substituted phenol having at least 7 carbons on the aliphatic hydrocarbon group in the acid medium which is prepared with an emulsifier selected from the group consisting of (I) a reagent comprising an acylated derivative of a basic aminoalcohol of the formula:

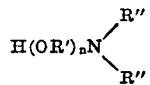

said derivatives thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

(II) a hydrophile oxyalkylated 2,4,6 $C_4$–$C_{12}$-hydrocarbon substituted monocyclic phenol $C_1$–$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

(V) a reagent comprising a substituted imidazoline selected from the group consisting of:

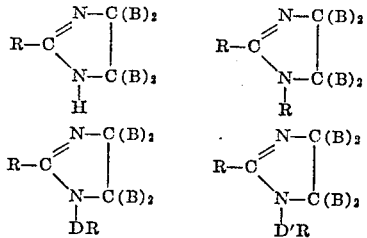

in which B represents at least one member selected from the class consisting of hydrogen and low molal alkyl radicals having less than 8 carbon atoms; D represents a divalent, nonamino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

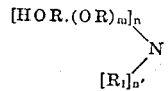

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of not more than one halogen atom from the co-valent to the electro-valent state, whereby said substituted phenol is emulsified in the acid medium without stabilizing oil-acid emulsions.

11. The composition of claim 10 where the aliphatic hydrocarbon substituted phenol is a member selected from the group consisting of alkyl phenol, alkenyl phenols, alkenyl alkyl phenols and mixtures thereof.

12. The composition of claim 10 where the aliphatic hydrocarbon substituted phenol is a mixture of alkylphenols having alkyl groups of 7–9 carbon atoms.

13. The composition of claim 10 where the aliphatic hydrocarbon substituted phenol is mononoylphenol.

14. The composition of claim 10 where the aliphatic hydrocarbon substituted phenol is dinonyl phenol.

15. The composition of claim 10 where the aliphatic hydrocarbon substituted phenol is dodecylphenol.

16. The composition of claim 10 where the aliphatic hydrocarbon substituted phenol is tetradecyl phenol.

17. The composition of claim 10 where the aliphatic hydrocarbon substituted phenol is pentadecyl phenol.

18. The composition of claim 10 where the aliphatic hydrocarbon substituted phenol is pentadecenyl phenol.

19. A composition of matter useful in preventing the formation of acid sludge during the acidization of oil-bearing strata which consists essentially of (1) 40–80% by volume of an aliphatic hydrocarbon substituted phenol having at least 7 carbons on said aliphatic hydrocarbon group; (2) 0–50% of a member selected from the group consisting of mono lower alkanol and lower mono alkanoic acid; and (3) an emulsifier selected from the group consisting of (I) a reagent comprising an acylated derivative of a basic aminoalcohol of the formula:

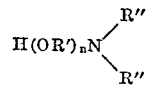

said derivatives thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; n is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

(II) a hydrophile oxyalkylated 2,4,6 $C_4$–$C_{12}$-hydrocarbon substituted monocyclic phenol $C_1$–$C_8$ aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) a blown fatty body selected from the group consisting of blown fatty oils and blown fatty acids, and (b) sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

(V) a reagent comprising a substituted imidazoline selected from the group consisting of:

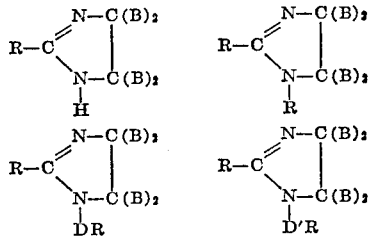

in which B represents at least one member selected from the class consisting of hydrogen and low molal alkyl radicals having less than 8 carbon atoms; D represents a divalent, nonamino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

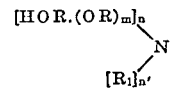

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; m represents a number varying from 0 to 3; n represents the numeral 1, 2, or 3; and n' represents the numeral 0, 1, or 2, with the proviso that $n+n'=3$; said reaction resulting in the conversion, per molecule of polyhalogenated reactant, of not more than one halogen atom from the co-valent to the electro-valent state, whereby said phenol is emulsified in the acid medium without stabilizing oil-acid emulsions.

20. A composition of matter useful in preventing the formation of acid sludge during the acidization of oil-bearing strata which consists of essentially of (1) 45–55% by volume of an aliphatic hydrocarbon substituted phenol having at least seven carbon atoms on said aliphatic hydrocarbon group; (2) 40–50% of a monohydroxy alcohol, and (3) 5–10% of an emulsifier selected from the group consisting of (I) A reagent comprising an acylated derivative of a basic aminoalcohol of the formula:

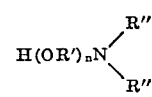

said derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; n is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

(II) a hydrophile oxyalkylated 2,4,6 $C_4$–$C_{12}$-hydrocarbon substituted monocyclic phenol $C_1$–$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b) respectively, constituting not less than 10% each of the total active matter of said mixture;

(V) a reagent comprising a substituted imidazoline selected from the group consisting of:

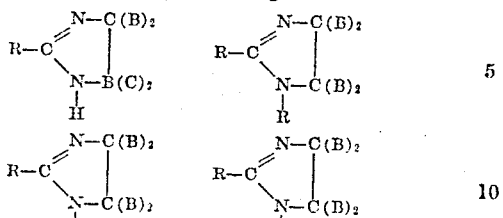

in which B represents at least one member selected from the class consisting of hydrogen and low molal alkyl radicals having less than 8 carbon atoms; D represents a divalent, nonamino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

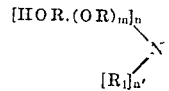

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of poly-halogenated reactant, of not more than one halogen atom from the co-valent to the electro-valent state, whereby said phenol is emulsified in the acid without stabilizing oil-acid emulsions.

References Cited in the file of this patent
UNITED STATES PATENTS

| | | |
|---|---|---|
| 2,024,718 | Chamberlain | Dec. 17, 1935 |
| 2,050,932 | De Groote | Aug. 11, 1936 |
| 2,125,429 | Denker | Aug. 2, 1938 |
| 2,314,022 | Stone | Mar. 16, 1943 |
| 2,589,199 | Monson | Mar. 11, 1952 |
| 2,814,593 | Beiswanger et al. | Nov. 26, 1957 |